United States Patent
Ngo et al.

(10) Patent No.: US 7,024,429 B2
(45) Date of Patent: Apr. 4, 2006

(54) DATA REPLICATION BASED UPON A NON-DESTRUCTIVE DATA MODEL

(75) Inventors: J. Thomas Ngo, Draper, UT (US); Russell Clark Barnett, Provo, UT (US)

(73) Assignee: Nextpage,Inc., Draper, UT (US)

( * ) Notice: Subject to any disclaimer, the term of this patent is extended or adjusted under 35 U.S.C. 154(b) by 352 days.

(21) Appl. No.: 10/059,233

(22) Filed: Jan. 31, 2002

(65) Prior Publication Data

US 2003/0145020 A1    Jul. 31, 2003

(51) Int. Cl.
G06F 17/30    (2006.01)
G06F 7/00    (2006.01)
G06F 12/00    (2006.01)

(52) U.S. Cl. ............... 707/201; 707/203; 707/204; 707/10; 711/165

(58) Field of Classification Search ........ 707/201, 707/203, 204, 10; 711/165; 345/744; 705/8
See application file for complete search history.

(56) References Cited

U.S. PATENT DOCUMENTS

| | | | |
|---|---|---|---|
| 4,620,276 A | 10/1986 | Daniell et al. | |
| 4,853,843 A | 8/1989 | Ecklund | |
| 5,261,094 A | 11/1993 | Everson et al. | |
| 5,265,164 A | 11/1993 | Matyas et al. | |
| 5,588,147 A | 12/1996 | Neeman et al. | |
| 5,684,984 A | 11/1997 | Jones et al. | |
| 5,734,852 A * | 3/1998 | Zias et al. | 345/744 |
| 5,737,601 A | 4/1998 | Jain et al. | |
| 5,737,738 A | 4/1998 | Sharman | |
| 5,745,753 A | 4/1998 | Mosher, Jr. | |
| 5,757,669 A | 5/1998 | Christie et al. | |
| 5,771,355 A | 6/1998 | Kuzma | |
| 5,781,912 A | 7/1998 | Demers et al. | |
| 5,787,247 A | 7/1998 | Norin et al. | |
| 5,787,442 A | 7/1998 | Hacherl et al. | |
| 5,794,253 A | 8/1998 | Norin et al. | |
| 5,799,306 A | 8/1998 | Sun et al. | |
| 5,806,075 A | 9/1998 | Jain et al. | |
| 5,812,793 A | 9/1998 | Shakib et al. | |
| 5,819,272 A | 10/1998 | Benson | |
| 5,832,225 A | 11/1998 | Hacherl et al. | |
| 5,832,514 A | 11/1998 | Norin et al. | |

(Continued)

OTHER PUBLICATIONS

User Manual for CVS 1.11.3, by Per Cederqvist et al., 1993.

(Continued)

*Primary Examiner*—Greta Robinson
*Assistant Examiner*—Kuen S. Lu
(74) *Attorney, Agent, or Firm*—Buchanan Ingersoll, PC

(57) ABSTRACT

In a data-replication system, multi-way synchronization of copies of the data at different devices is achieved by employing a non-destructive data model. In this model, each replicated data object is represented by a revision graph, and every operation that is performed on a data object, e.g. a revision of data content or deletion of the object, is represented by adding a node to a revision graph at the device where the change is made. Synchronization between multiple devices is achieved by applying a graph union operator. Since the union operator is commutative and associative, it avoids the limitations normally associated with the order in which updates occur. A synchronization enforcement mechanism restricts the situations in which the nodes of a graph can be deleted, to thereby ensure integrity of the data throughout its useful life cycle.

119 Claims, 6 Drawing Sheets

U.S. PATENT DOCUMENTS

| | | |
|---|---|---|
| 5,838,921 A | 11/1998 | Speeter |
| 5,859,790 A | 1/1999 | Sidwell |
| 5,884,324 A | 3/1999 | Cheng et al. |
| 5,937,414 A | 8/1999 | Souder et al. |
| 5,946,689 A | 8/1999 | Yanaka et al. |
| 5,950,198 A | 9/1999 | Falls et al. |
| 5,956,489 A | 9/1999 | San Andres et al. |
| 5,960,460 A | 9/1999 | Marasco et al. |
| 5,991,768 A | 11/1999 | Sun et al. |
| 5,995,980 A | 11/1999 | Olson et al. |
| 6,049,809 A | 4/2000 | Raman et al. |
| 6,058,401 A | 5/2000 | Stamos et al. |
| 6,088,721 A | 7/2000 | Lin et al. |
| 6,122,630 A | 9/2000 | Strickler et al. |
| 6,138,124 A | 10/2000 | Beckhardt |
| 6,144,999 A * | 11/2000 | Khalidi et al. ............... 709/219 |
| 6,167,427 A | 12/2000 | Rabinovich et al. |
| 6,167,437 A | 12/2000 | Stevens et al. |
| 6,167,438 A | 12/2000 | Yates et al. |
| 6,182,117 B1 | 1/2001 | Christie et al. |
| 6,199,082 B1 | 3/2001 | Ferrel et al. |
| 6,253,211 B1 | 6/2001 | Gillies et al. |
| 6,301,589 B1 | 10/2001 | Hirashima et al. |
| 6,304,882 B1 | 10/2001 | Strellis et al. |
| 6,615,223 B1 * | 9/2003 | Shih et al. .................. 707/201 |
| 2001/0037398 A1 * | 11/2001 | Chao et al. ................. 709/230 |
| 2002/0138447 A1 * | 9/2002 | Dutta .......................... 705/70 |
| 2003/0126391 A1 * | 7/2003 | Neufeld et al. ............. 711/165 |
| 2003/0130882 A1 * | 7/2003 | Shuttleworth et al. ......... 705/8 |
| 2004/0034670 A1 * | 2/2004 | Bhuyan ...................... 707/204 |

OTHER PUBLICATIONS

Product Backgrounder for Groove Desktop Collaboration Software, Jan. 2003, and selected pages from User's Guide relating to Shared Spaces and Synchronization.

* cited by examiner

DATA REPLICATION BASED UPON A NON-DESTRUCTIVE DATA MODEL

FIELD OF THE INVENTION

The present invention is generally directed to the distribution of information for sharing by users and/or group collaboration, and more particularly to systems which replicate information at multiple locations and provide synchronization of changes made to the information at those locations.

BACKGROUND OF THE INVENTION

The dissemination of information to multiple users can be classified into two general categories. In one category, the information is managed at a central facility that is accessed by the users when they require the information. The information may be resident on multiple information servers that are geographically remote from one another, but are accessed through a central point by the users. In this type of system, the information is not replicated, except when a user manually saves a document in local storage, or the data is temporarily stored in cache memory as part of the information retrieval mechanism. In this type of system, only one master copy of the information exists, and therefore control over its content is easily maintained. An example of this type of information dissemination system is an Internet website.

An inherent requirement of this category of system is that the user must be connected to the central facility in order to access the information. As a result, a disconnected user, e.g. an employee traveling on an airplane, is limited in terms of the ability to obtain the information when needed. Even when a user is connected, excessive load on a server or network performance issues, such as low bandwidth or high latency, can result in inefficient access. Accordingly, the second general type of information dissemination system employs data replication. In this type of system, copies of the information are disseminated to, and stored at, multiple nodes. Once the copy has been stored at a node, the user is no longer required to be connected to the information source in order to access the information. Although advantageous from this standpoint, replication systems present a number of other issues that must be addressed. Foremost among these is the need to maintain consistency among the replicated copies of the information at the nodes. If changes are made to the information, these changes need to be disseminated to all of the nodes. Accordingly, replication systems employ different approaches for synchronizing the information among the multiple nodes.

One approach employs a single master version of the information, which is disseminated from a central source to replicas on remote devices that form the local nodes. The data flow is in one direction only, from the central master to the remote devices. In this type of system, all write operations occur at the master, and the users at the remote devices have read-only privileges. The set of information that is stored on each remote device is regarded as being no larger and no older than the central master.

When the number of content recipients is large, the central source can become overloaded. Furthermore, there is the possibility that a large number of nodes might be connected to the central source by a common network that can experience bandwidth bottlenecks. To address these types of performance issues, hyperdistribution systems might be desirable. In this type of arrangement, the information content is disseminated from the central source to a plurality of intermediate distribution points, and from there to the ultimate recipients at the remote locations.

Alternatively, a multiple master approach may be desirable, where users at the remote devices have the ability to modify the data. In this approach the potential exists for conflicting versions of the data at different nodes. Some multi-master systems address this issue by utilizing conflict avoidance, whereas others employ conflict resolution. To achieve conflict avoidance, a single user or application must be able to lock access to a data object before a write operation takes place, so that plural simultaneous edits cannot occur. To obtain a lock, however, connection to a resource which manages the locks is necessary. Hence, conflict avoidance is most practical in systems where the modifications are relatively infrequent.

In contrast, conflict resolution systems permit multiple simultaneous edits to occur, and conflicts are reconciled afterward. One type of dissemination system that is capable of resolving conflicts employs hub-and-spoke synchronization. This type of synchronization is commonly found, for example, in personal information management systems, in which mobile users are able to reconcile calendar and contact information with a single point of control. In this arrangement, each user device, e.g. personal digital assistant, carries a subset of the data in a central reference repository. When a device is connected to the central repository, its data set is synchronized with the reference data set. An example of this type of system is disclosed in U.S. Pat. No. 6,295,541. In these types of systems, the central repository functions as a clearinghouse for conflict resolution. Typically, immediate resolution is provided during synchronization, for example on the basis of time stamps. The business logic associated with this approach assumes that the individual who is performing the synchronization is the best person to resolve conflicts that arise during the synchronization. The conflict resolution process involves replacement of the older version of the information with the newer version, i.e., the prior version ceases to exist after conflict resolution.

An alternative to the hub-and-spoke arrangement is a peer-to-peer network, in which no single device functions as a central master. In this system, any device can synchronize with any other device at any time. This type of arrangement may be more suited to operations such as team collaboration. However, conflicting data entries can appear and be resolved many times, as disparate versions of the information propagate independently through the network and collide at various locations. Unlike hub-and-spoke mechanisms, there is no single valid version of the information, with respect to which the data set on a given device can be considered to be merely out of date.

Various combinations of these systems might also exist. For example, a project that employs hub-and-spoke synchronization for collaboration might also require hyperdistribution from a publisher. As a further extension of this arrangement, an object from a publisher might need to be identified with a corresponding object on the user's devices, and a workflow mechanism might allow each user to accept or postpone acceptance of any revisions to that object. As another example, a handheld device might be slaved via hub-and-spoke synchronization to a laptop, that also participates in peer-to-peer synchronization with other laptops.

Many data replication systems are based on a model that assumes that there is only one correct version of a data object at any given time. To assure a high degree of consistency among the copies of that data object, there is an implicit requirement that the nodes connect to one another on a frequent basis, so that the amount of revision to a data object between updates is relatively small. Thus, in a hub-and-spoke system, for example, since all information is expected to flow through the hub, frequent connections along the links that constitute the spokes are formed.

When there is no central hub for conflict resolution, an order-dependent approach can be employed to resolve the conflicts, but this can lead to unpredictable results. For instance, if node A is synchronized with node B, and then node B is synchronized with node C, one version of the data may be generated, whereas if node A is synchronized with node C and then node B is synchronized with node C, a different version may result.

It may be preferable to utilize an order-independent approach that allows business logic rules to be enforced in a way that provides more consistent results. If resolution is to be accomplished immediately, however, the business logic rules may have to be somewhat limited and/or restrictive.

It is an objective of the present invention to provide a framework for data replication that employs a different model to support relatively long periods of disconnection, and yet is compatible with each of the various dataflow techniques for replication described previously.

SUMMARY OF THE INVENTION

In accordance with the present invention, these objectives are achieved by employing a non-destructive data model that allows different versions of a data object to co-exist. As a result, the resolution of a conflict can be deferred, to thereby provide maximal generality in the expression and enforcement of business logic rules.

In the model, every operation that is performed on a data object, e.g. a revision of data content or deletion of the object, is represented by an element in a revision graph for the data object. Synchronization between nodes is achieved by combining elements of their graphs, e.g. a union operator, rather than replacing one version of the data with another. Since the union operator is commutative and associative, it avoids the need for hard decisions based on factors such as the order in which updates occur, for instance.

Multiple versions of the data object are managed through different views. A cursor identifies the element in the revision graph that represents the current version of the data object at a node. When the user accesses the data object, the current version is presented in an application view. As a result of the synchronization operation, multiple cursors may be present in the graph, thereby presenting a conflict. In this case, a conflict resolution view can be presented to display multiple candidate versions for the user to select from as the current version, based on any suitable business logic.

A synchronization enforcement mechanism restricts the situations in which the nodes of a graph can be deleted, to thereby ensure integrity of the data throughout its useful life cycle. Different devices can be classified according to different respective levels of storage volatility. A revision can be deleted from a revision graph at a device having a given volatility level if the same revision is known to be stored at a device having a lower level of volatility. When a revision has reached the end of its useful life, it is stored at a designated device, and can then be removed from all other devices.

These and other features of the invention are described hereinafter with reference to exemplary embodiments illustrated in the accompanying drawings.

DETAILED DESCRIPTION

The present invention is applicable to all types of information dissemination systems which employ replication of data objects at multiple locations. A data object can include a task, a document, a saved search, a list of contacts, a file, a discussion entry, a field entry, or a container of other objects such as a folder, among others. To facilitate an understanding of the concepts which underlie the present invention, examples of the invention are described hereinafter with reference to a document that undergoes modification in a group collaboration. It will be appreciated, however, that these descriptions are merely exemplary, and should not be construed to limit the practical applications of the invention in any manner.

Overview

Figure 1:
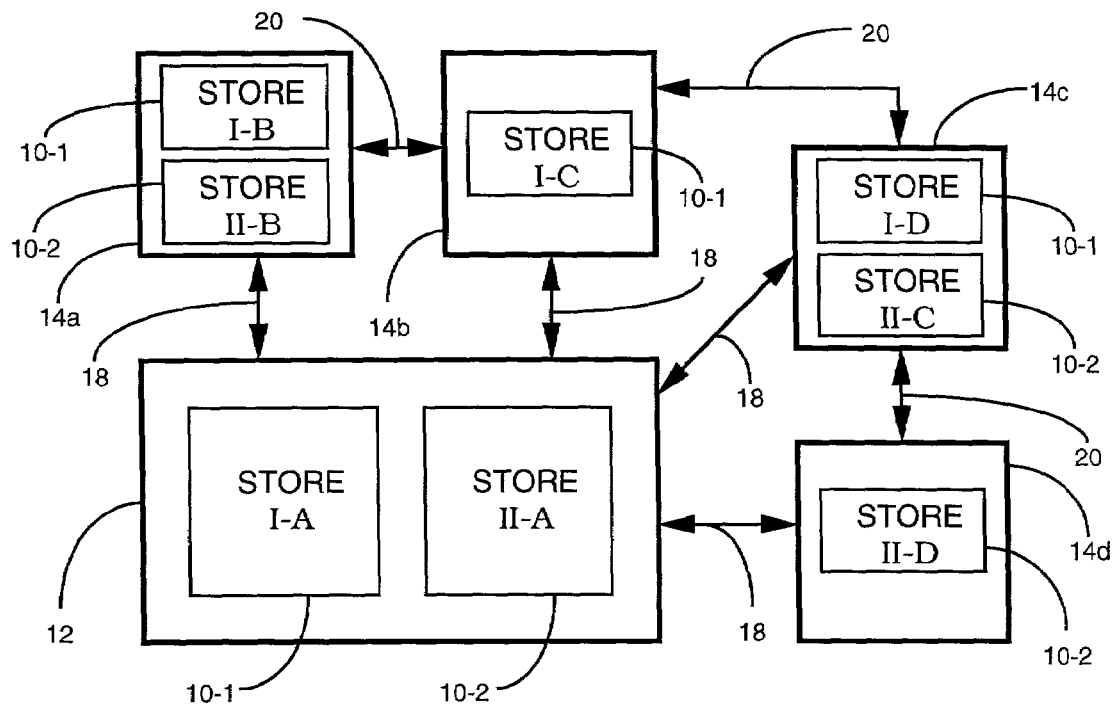
FIG. 1 is a block diagram of one exemplary environment in which the present invention can be employed.

One example of an environment in which the replication system of the present invention can be employed is illustrated in the block diagram of FIG. 1. Information to be shared among multiple locations is associated with a store 10. In general, a store comprises a set of data objects that are affiliated with one another. For instance, the data objects in a store 10-1 could contain information that pertains to a particular collaboration project, for example tasks, timelines, project documents, messages between project participants, etc. As another example, a store 10-2 could be a collection of information to be delivered to users by a service, e.g. the contents of a library. In the example of FIG. 1, the two different stores 10-1 and 10-2 are located at a central server 12.

Either or both of the stores are replicated in local devices 14. A local device could be a personal computer, a laptop computer, a handheld personal digital assistant, or the like. The union of all the stores associated with a given set of data objects on the central device 12 and the local devices 14 constitutes a space. Thus, all of the stores 10-1 form a first space I, and are labeled Store I-A, Store I-B, etc. Similarly, all of the stores 10-2 form a second space II, and are labeled Store II-A, Store II-B, etc. A space, therefore, might be a group collaboration project, or a content repository.

Every device does not necessarily contain a store for every space. In the example of FIG. 1, stores for both spaces I and II are located in the central server 12 and the local devices 14a and 14c. The user of device 14b may be a member of the group collaboration project associated with space I, and therefore that device contains a store for objects affiliated with that space. However, the user may not subscribe to the library associated with space II, therefore a store for that space is not present on device 14*b*. Conversely, the user of device 14*d* may subscribe to the library but not be a member of the group collaboration project, and therefore this device only contains a store for space II.

In the embodiment of FIG. 1, the stores can synchronize themselves by connection to the central facility 12, for example by means of communication links 18. Thus, the devices 12, 14 can operate in the manner of a hub-and-spoke system. In a content distribution system, synchronization occurs by way of one-way updates, from the central server 12 at the hub to the local devices 14 on the spokes. In the case of a hyperdistribution system (not illustrated), one-way updates go from the hub to intermediate devices, and further one-way updates occur from the intermediate devices to the local devices at the edge of the architecture. Depending upon the size of the system, multiple layers of intermediate devices can be employed.

In a collaborative system, two-way updates can occur between the hub and each of the local devices. In addition, the devices 14 may be able to communicate directly with one another, by means of links 20. In this case, the store in one local device 14 can be synchronized with the corresponding store in another local device 14 without connecting to the central facility 12. In this case, the devices operate in the manner of a peer-to-peer network.

In an alternate implementation, there may be no central facility 12, and all of the local devices communicate with each other by means of the peer-to-peer network formed by the links 20. The devices may communicate directly and sporadically with one another, or by means of an intermediate device. Consequently, a given change may propagate gradually through the network as synchronization operations are performed.

Atom Graphs and Synchronization

Figure 2:
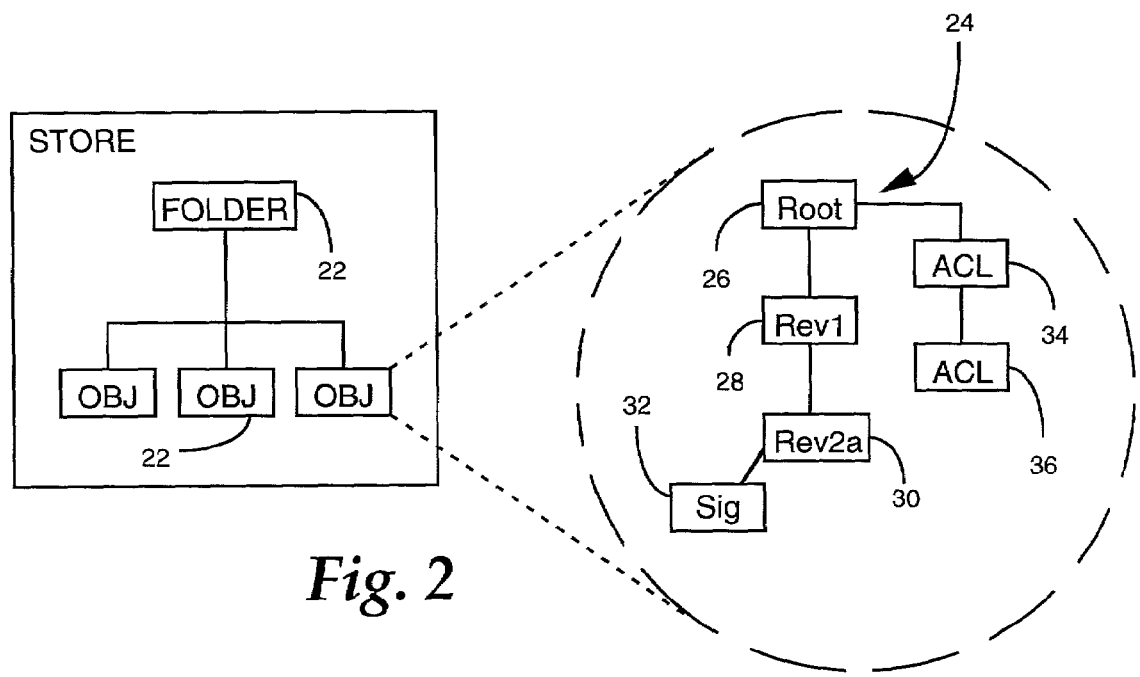
FIG. 2 is a block diagram illustrating an atom graph for a data object.

Referring to FIG. 2, each store 10 contains a plurality of data objects 22. A given data object might be a document, a task associated with a project, an e-mail message, a container such as a folder, or the like. In accordance with the present invention, each object 22 in a store is represented by a revision graph 24. The graph consists of one or more nodes, hereinafter referred to as "atoms". The graph originates at a root atom 26 that is formed when the object is first created. The graph may include one or more atoms of a first type, that represent successive stages in the evolution of the object. For example, if the object is a document, when it is first created the root atom 26 is formed. Thereafter, the document may undergo a first revision, in which case a descendant atom 28 representing this revision is created and added to the graph. Later, the document may undergo a second revision, in which case another descendant atom 30 is created and added to the graph.

In essence, the graph represents the history of a data object. Each revision atom 28, 30 is connected to a parent atom representing a previous version of the object. Hence, the revision graph is connected, directed and acyclic, such that each atom in the graph, other than the root atom, is connected to at least one immediately prior parent atom.

Figure 2A:
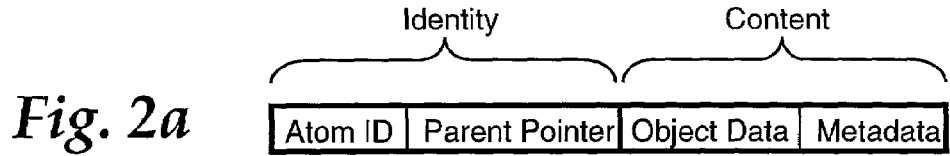
FIG. 2a shows the data structure of an atom.

Referring to FIG. 2*a*, each atom in the graph consists of two basic components, its identity and its content. An atom's identity comprises a unique identifier and a pointer to its parent atom in the graph. An atom's content comprises the data of the object, e.g the text of a document, and metadata associated with the atom, such as its modification date, and the like. As described in detail hereinafter, under certain conditions an atom's content can be deleted from a store, leaving only its identity, to thereby conserve storage space.

The content of an atom can be stored in a variety of forms. In one case, the data for the object 22 can be self-contained in each atom. For example, if the data object is a text document, the text of the original document can be stored in root atom 26, the entire text of Revision 1 can be contained in atom 28, and the entire text of Revision 2*a* can be stored in atom 30. As an alternative, root atom 26 could store the original text, and each of the revision atoms 28 and 30 could contain only those changes necessary to construct the revised versions from the data in their parent atoms. In yet another variation, the latest atom in the sequence, i.e. atom 30 in FIG. 2, can contain the complete text, and each of the preceding atoms can store the differences needed to reconstruct their respective versions of the data object from their descendant atoms.

In addition to revision atoms that pertain to dynamic changes in the content of the object, the graph can include other types of atoms. For instance, after making the second revision represented by the atom 30, a user may digitally sign the document or otherwise provide it with an approval marking. In that case, a signature atom 32 is added to the graph, and is connected to the atom 30 associated with the version of the document that was signed. Other attributes of the object can be represented by other types of atoms. For instance, an access control list for the object can be represented by an atom 34. If the access control list is modified during the life of the object, successive atoms 36 are created for the revisions of the list.

In the embodiment of FIG. 2, the atoms 34, 36 for the access control list are connected to the root atom 26 for the data object. In an alternative implementation, an access control list can be a separate data object, with its own atom graph. In this latter implementation, revisions of the access control list are not included in the same atom graph as the core data object 22. Furthermore, one access control list can be associated with multiple data objects 22, rather than having a one-to-one relationship.

Representing the history of data objects in the form of atom graphs enables synchronization between replicas of the same object on two local devices 14 to be achieved by combining atoms from each of the two replicas' graphs to form an updated graph. Thus, an update is achieved by copying atoms from a sending device to a receiving device. In a preferred implementation of the invention, the updated graph resulting from such an operation is the mathematical union of the two replicas' original graphs. In some cases, however, it may not be desirable or appropriate to perform a complete union of the two graphs. In the more general context of the invention, therefore, an update can include the situation where one or more, but not necessarily all, of the atoms present in a first store and absent from a second store are copied to the second store, and added to the graph of the second store. Expressed in mathematical terms, the atom graph that results from an update is a strict superset of the atom graph that existed in the receiving store prior to the update, i.e. it contains at least one additional atom, and a non-strict subset of the union of the two previously existing graphs, wherein it could be equal to the union, or contain fewer atoms than the union.

Figure 3:
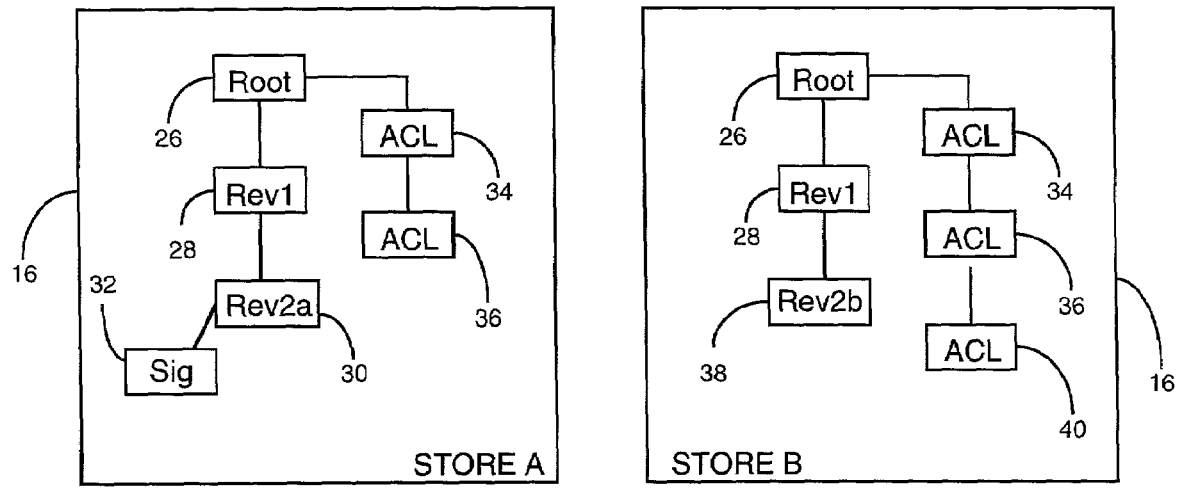
FIG. 3 is a block diagram of the union of two atom graphs.
Figure 3:
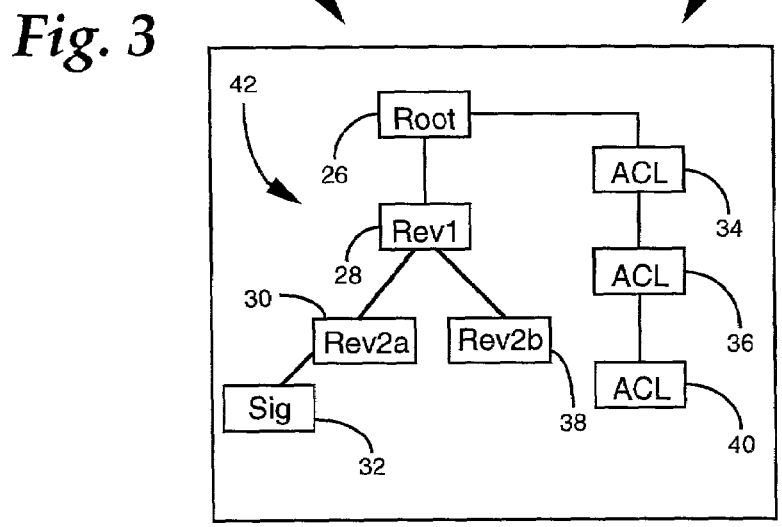

Referring to FIG. 3, an example of a synchronization utilizing the union operator is illustrated. Store A in a first device contains the atom graph 24 illustrated in FIG. 2. A second device contains Store B, having an atom graph for the same object. In this case, the first two nodes 27 and 28 of the atom graph are the same as those of Store A. For instance, the two devices may have been synchronized with one another after the first revision was made. Thereafter, the devices may have become disconnected. While in the disconnected state, one user may have made a further revision to the data object, represented by the atom 30 in Store A. Another user may have also revised the document at the device where Store B is located. In this case, therefore, an atom 38 is created at that device, to represent the revision. In addition, the user may have made a further modification of the access control list, as a result of which an atom 40 was added to the graph.

When Store A is subsequently synchronized to Store B, a union of the two graphs is formed. The resulting graph 42 contains both of the atoms 30 and 38 that represent the two revisions that were separately made on the data object. In addition, it contains the additional atom 40 that identifies the further modification of the access control list. Typically, when a synchronization operation occurs, information flows in both directions between the two stores, so that each of the two stores contains the graph 42 representing the union of their respective graphs. Of course, it is also possible to perform a one-way update. For example, information from Store B can be transmitted to Store A, so that Store A contains the union graph 42. However, Store B may not receive information from Store A, in which case its atom graph would remain in its original state.

Figure 4:
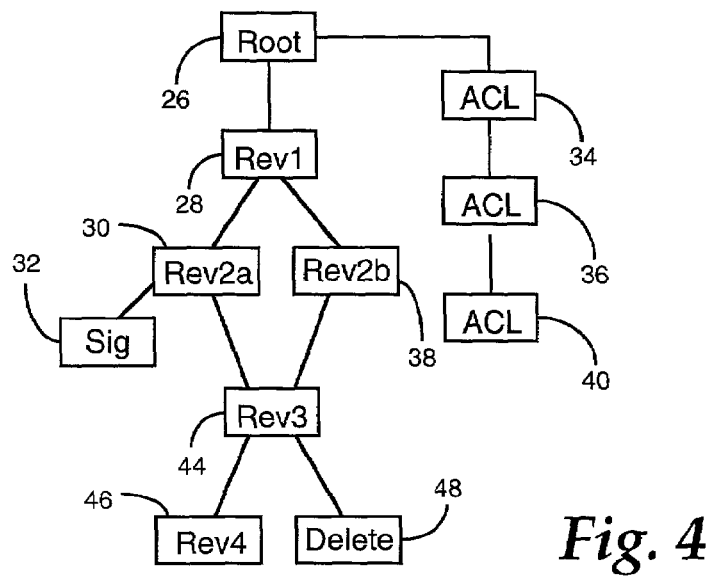
FIG. 4 is a block diagram illustrating a further union of two atom graphs.

In addition to revisions of a data object, atoms are created when other types of operations are also carried out on the data object that result in a change to its contents. One example of such an operation is the deletion of the data object. FIG. 4 illustrates an example in which, after the synchronization represented by the atom graph of 42 of FIG. 3, the two users collaborate to create a further revision 44 of the document, e.g., while they are connected in a peer-to-peer relationship. Thereafter, when they are disconnected, the user at the device containing Store A makes a further revision 46 of the data object, whereas the user at the device containing Store B deletes the object. This operation is represented by a deletion atom 48. When the two stores are thereafter synchronized to one another, the resulting atom graph will contain the nodes illustrated in FIG. 4.

Figure 5A:
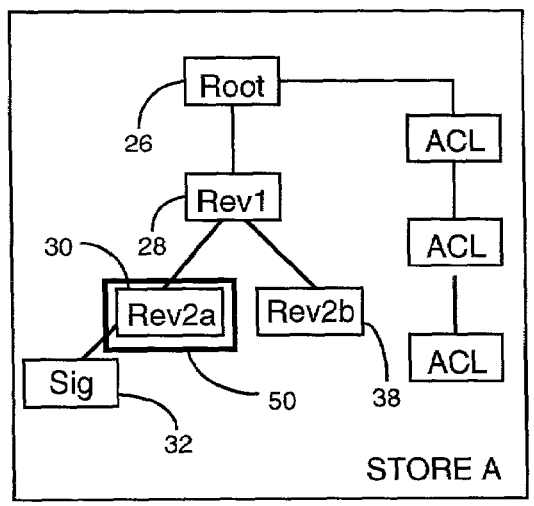
FIGS. 5a and 5b are block diagrams illustrating a cursor in an atom graph.
Figure 5B:
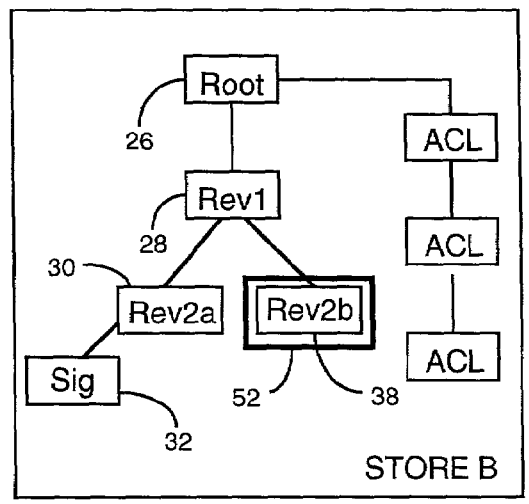

As a result of the union operation, the atom graph 42 contains two different atoms that might represent the most current version of the data object, namely revision 2*a* represented by atom 30 and revision 2*b* represented by atom 38. Atoms 30 and 38 both descend from the same parent atom 28. Hence, when the user issues a command to view the data object within an application after the union has occurred, e.g., open a document in a word processing program, an issue arises as to which of the two revisions should be presented to the user. In accordance with one embodiment of the invention, each store can include a pointer, or cursor, that identifies the atom representing the data object's current version for that store. Referring to FIGS. 5*a* and 5*b*, after a complete, i.e., two-way, synchronization, it can be seen that each of Store A and Store B contain the same atom graph. Store A also contains a cursor 50 that points to atom 30, associated with revision 2*a*. Thus, when an application running on a local device that contains Store A retrieves the data object, the view that will be presented to the user is the version of the object associated with revision 2*a*. The atom 30 might be the target of the cursor on the basis that it was the last version of the object to be viewed at the device. In contrast, Store B contains a cursor 52 that points to atom 38, because it was the last version accessed at its associated device. In this case, when the application retrieves the data object at the local device containing Store B, the user will be presented with the version of the data object associated with revision 2*b*.

Figure 6:
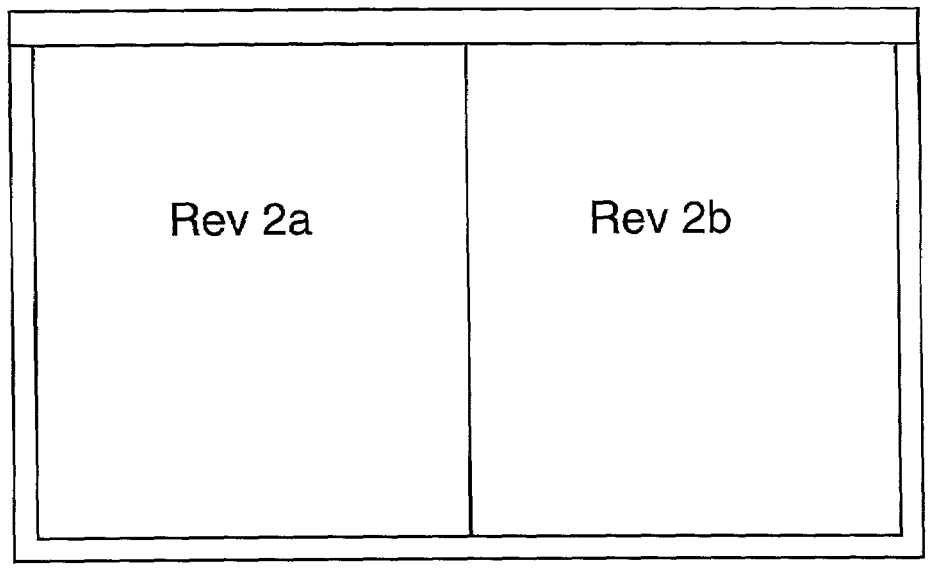
FIG. 6 is an illustration of a view window for conflict resolution.

Since synchronization is effected by the union of two or more atom graphs, the present invention results in a non-destructive data model for the replication and synchronization of information. As a result, conflicts do not arise in the course of a synchronization operation itself. Furthermore, more than two parties can synchronize with one another, without creating confusion. A conflict is represented by a diversion in the atom graph, as depicted by atoms 30 and 38 in the graph of FIG. 3, and atoms 46 and 48 in the graph of FIG. 4. As described previously, the cursor is employed to determine which view of a data object, from among two or more possible views, is to be presented within the context of an application. After a synchronization operation, the resulting graph might contain two or more cursors, e.g. both of cursors 50 and 52. Another type of view can be employed to resolve the conflict in this situation. In this view, multiple candidate versions of the data object are displayed to the user. For instance, a multiple pane window might be employed, as illustrated in FIG. 6. In the case of the atom graph 42 illustrated in FIG. 3, the left pane of the window can display revision 2*a* of the data object, whereas the right pane can display revision 2*b*. In the case of the atom graph illustrated in FIG. 4, the left pane would display revision 4 of the data object, whereas the right pane would be blank, to illustrate the fact that the object has been deleted. By comparing the two versions of the object represented in such a view, the user can determine which version is preferable and save it as the next version to resolve the conflict. Alternatively, rather than merely saving one of the versions, the user might create a new version which results from a synthesis of the two conflicting versions. In this case, the atom that represents the new version is connected to both of the atoms that represent the versions from which it was derived, as in the case of atom 44 in FIG. 4.

As an alternative to assigning the cursor in this manner, it may be preferable to allow the application to employ a set of business rules by which the conflict is resolved and the current version is automatically chosen. For instance, certain types of metadata could be associated with each object, e.g., author of the revision, date and time stamp, etc. This metadata can be assigned on a per-store basis. The business rules can then use that metadata as appropriate to designate the current version. Examples of applicable rules include time-based, trust based (e.g., a revision made by a manager might get preference over a staff-level employee), or application-specific.

This metadata can be transmitted to recipient stores during synchronization operations, e.g. together with any atoms that are transmitted. The recipient store can then use all of the metadata associated with a data object, both that created locally and that received from other stores, to resolve any conflicts according to the business logic rules employed at that store, to produce a new cursor location. Each conflict could be resolved immediately each time new metadata is created or received. Alternatively, the store could retain all of the metadata and apply the rules of conflict resolution each time a request is made to view the object.

Yet another alternative is to defer resolution of the conflict until another time, for example by another user who is authorized to do so, such as a manager. For instance, conflicting changes could be made to a data object at each of two stores A and B. After the stores synchronize with one another, each store continues to present the view of the object corresponding to the revision that was made at the device on which that store is located. Thereafter, one of the two stores can synchronize with a third store C, whose user is authorized to resolve the conflict. The user is provided with notice of the conflict, and resolves it, e.g. by selecting one of the two conflicting versions as the current version. This resolution is then passed on to stores A and B, as well as other stores in the same space, during subsequent synchronization operations, for example in the form of a new cursor position.

Bundle Mechanism

During synchronization operations, an atom may be copied from store to store to store, until it is eventually disseminated to all of the devices that participate in the space with which the stores are associated. During each synchronization, the sending device determines which atoms to send to the receiving device. For example, as part of the protocol for updating a store, the receiving store may transmit a message to the sending store which includes an inventory of the atoms it contains, and the sending store can reply with a list of atoms that it contains but the receiving store does not. In accordance with another feature of the invention, a bundling process is employed to compress the amount of data that needs to be exchanged between the stores as part of the protocol. A bundle comprises a group of atoms within a store that are designated to stay together as they are replicated from one device to another. In addition to the atoms per se, a bundle can also include the metadata that is employed for conflict resolution, and any structural information that may be required to form the graph union at the recipient device. The designation of bundle content is carried out by the device on which the atoms were created. For instance, in the example of FIG. 3, Store A may determine that atoms 30 and 32 should be bundled together. As a result, whenever two devices are synchronized with one another, atom 30 will not be transmitted by itself. Rather, it will always be accompanied by atom 32. In a case where each atom migrates to other stores as early as physically possible, atoms 30 and 32 would be destined to stay together, i.e. the bundle mechanism does not cause superfluous atoms to be transmitted.

Thus, rather than identifying each of atoms 30 and 32 in the synchronization protocol, the sending store only needs to indicate that a particular bundle will be sent. Hence, as more atoms are added to a bundle, greater savings in message transmission are achieved. Other economies are gained through the use of the bundling mechanism. For instance, once a number of atoms have been grouped into a bundle, the entire bundle can be treated as a single unit for purposes of compression, encryption, and the like. A bundle need not be limited to atoms for a single data object. Rather, a bundle may contain atoms from several different objects in a store, e.g., a document, an e-mail message, and an access control list. Each store can employ any appropriate set of rules for determining bundle membership. For instance, a store that participates in infrequent synchronizations might create a bundle from all atoms created between synchronization events. A store that serves content to a large number of devices might create a temporally-based bundle of atoms, e.g., all the atoms created in a given week. If extremely fine control is required in the management of data objects, each atom might be designated as a separate bundle.

Before an atom is assigned to a bundle, it can undergo multiple revisions. For instance, each time that a user revises and then saves a document, the atom associated with this version of the document can be modified to incorporate the latest changes. Similarly, if the user decides to cancel the revisions, the atom associated with those revisions can be deleted. However, once an atom is assigned to a bundle, its contents become fixed. Thereafter, any further operations on the data object result in the creation of a new atom, rather than further modifications of the assigned atom. In this case, a new arc is added to the atom graph, which originates at the newly assigned atom and terminates at the newly created atom. If the application so dictates, the cursor is moved to point to the newly created atom.

In a similar manner, a bundle can have a variable state until a defining event occurs. This event could be designation of the bundle as being ready for transmission. Until this designation occurs, atoms can be assigned to or removed from a bundle as desired. Once the designation takes place, the bundle is created, i.e., the assigned atoms are assembled into a set and the bundle is given an identifier. In addition, the bundle may be prepared for transmission by compressing the data for the set of atoms. Once these actions occur, the contents of the bundle are fixed, and remain constant as the bundle is transmitted from store to store.

The creation of the bundle and preparation for transmission can take place automatically in advance of the transmission, e.g., at regularly scheduled intervals. Alternatively, it can be done in response to a message from another store requesting a transmission, e.g., receipt of the other store's bundle inventory, or some other just-in-time basis.

In addition to designating atoms that travel together during synchronization operations, the bundles are also employed to manage the atom graphs within the stores during the life cycle of a data object. To this end, each store is assigned one of multiple levels of volatility. For example, a store might be classified as a volatile store or as a non-volatile store. These different levels of classification determine the conditions under which it is acceptable for a store to delete some or all of the information pertaining to an atom. For instance, if a bundle is present in a non-volatile store, a volatile store can safely delete the content of an atom assigned to that bundle, so that only its identity remains in the volatile store.

Another possible classification is a final store, which performs functions such as archival when a data object has reached the end of its life. For instance, when a collaborative space is to be closed down, the final store can be used to create a permanent archive of the data objects for that space. When this is to occur, all of the bundles associated with that data object are moved to the final store. Once a bundle has been moved to a final store, the volatile and non-volatile stores can delete the atoms assigned to those bundles. In this case, the identities of the atoms are deleted, as well as the content of the atoms.

In addition to archiving the data objects in a given space, the final store can be employed for end-of-life operation on individual atoms. For instance, in a publishing environment, it may be desirable to retire specific revisions from circulation. Once the atom associated with a particular revision has been moved to a final store, it can be deleted from all of the other stores. In this case, the entire atom is deleted, i.e. both its content and identity.

It is also possible for non-conforming stores to exist, which do not follow the foregoing rules of behavior regarding volatility and end-of-life operations. These types of stores can receive data objects from conforming stores, but do not forward atom graphs or bundles to other stores.

To facilitate transmission and storage management of data objects, each bundle has two attributes associated with it. One of these attributes is a bundle identifier that uniquely designates each bundle. For example, the bundle identifier may comprise a store ID that is unique to the store in which it was created, followed by a bundle index. The bundle index can be an integer that is incremented by the store each time it creates a new bundle. This type of identifier facilitates space-efficient representation of a set of bundle identifiers, for example by means of run-length encoding. As a result, the amount of data that must be transmitted between two devices during a synchronization process can be reduced, thereby saving bandwidth.

The second attribute associated with a bundle is a volatility flag. This flag identifies the volatility class of the least volatile store that contains a copy of the bundle. For instance, if a bundle is copied from a volatile store to a nonvolatile store, the volatility flag of that bundle is updated to reflect the fact that the bundle is now stored in a non-volatile store. This flag is then propagated to all of the other devices during synchronization operations. Thus, during a synchronization operation, even if a given store contains a copy of a particular bundle, a check is made to see whether the sending store's copy of that bundle contains a flag indicating a lower level of volatility. If so, the flag at the receiving store is updated to reflect the lower level of volatility, and passed on to other stores during other synchronization operations.

The bundle identifier is assigned on a per-bundle basis, and remains the same for every copy of the bundle in the various stores. In contrast, the volatility flag is assigned and updated on a store-by-store basis, as synchronization operations take place.

A further attribute that can be associated with a bundle is a completeness flag. As noted above, when a bundle is resident in a non-volatile store, the contents of its constituent atoms can be identified for deletion from volatile stores. The completeness flag is employed to indicate whether the atoms of a bundle in a given store contain both their identities and their contents, i.e. they are complete, or only their identities, in which case they are labeled as incomplete. As with the volatility flag, the completeness flag is set on a store-by-store basis.

In some situations, it may be the case that a receiving store may request only part of a bundle during an update operation. In this case, the sending store can create and send a response that contains only the requested part of the bundle. Accordingly, at the recipient store the completeness flag for the bundle would not be set.

The completeness flag can be employed in a variety of manners. For instance, in one embodiment of the invention, during a synchronization operation the receiving store can inform the sending store of the state of completeness of its bundles, or merely exclude all incomplete bundles from the inventory it transmits to the sending store. In either of these cases, the sending store can send all of the incomplete bundles to the receiving store. In addition, the completeness flag can be used locally, to notify a user that connection to a non-volatile store is necessary if the user attempts to view an object with an incomplete bundle.

An example of bundle management is depicted in FIGS. 7A–7F. In the figures, three stores 10, labeled A, B and C, are illustrated. These three stores are associated with the same space, e.g., a group collaboration project. Store A and Store B are volatile stores, whereas Store C is a non-volatile store. At the initial phase illustrated in FIG. 7A, each of Store A and Store B contains a bundle 54 created in that store, respectively. Each bundle is labeled with its bundle identifier (e.g., A1, B1), volatility flag (V, N or F) and its completeness flag (1=complete, 0=incomplete). Since each of stores A and B is a volatile store, the volatility flag is set to "V".

Figure 7A:
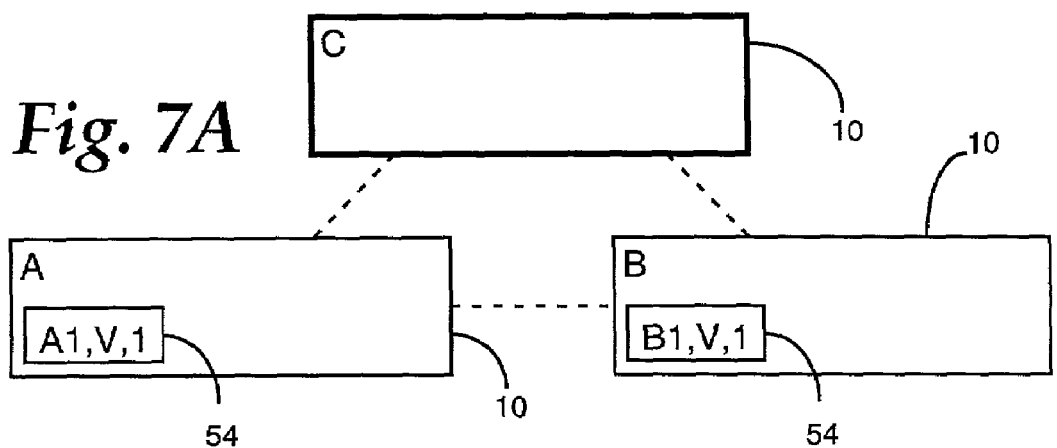
FIGS. 7A–7F illustrate a sequence of steps in the synchronization of stores and updating of bundle information.
Figure 7B:
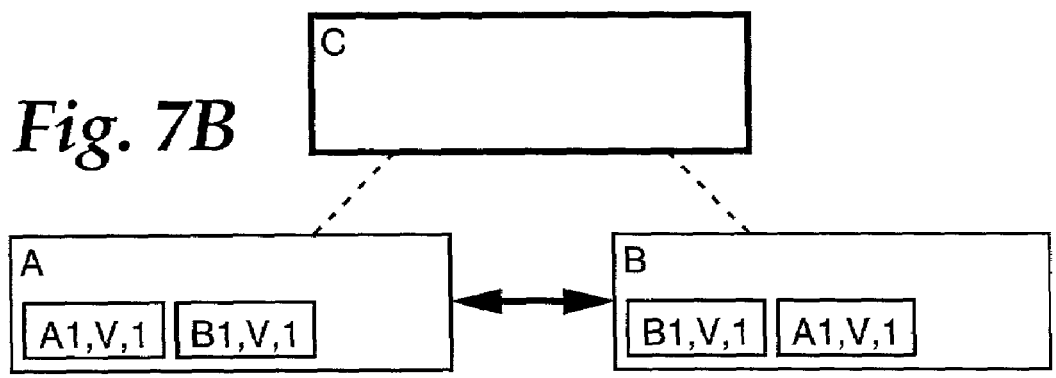

In FIG. 7B, Stores A and B synchronize with one another. As a result, bundle A1 is copied to Store B, and bundle B1 is copied to Store A. Since both stores have the same volatility level, no changes occur in their volatility flags.

Figure 7C:
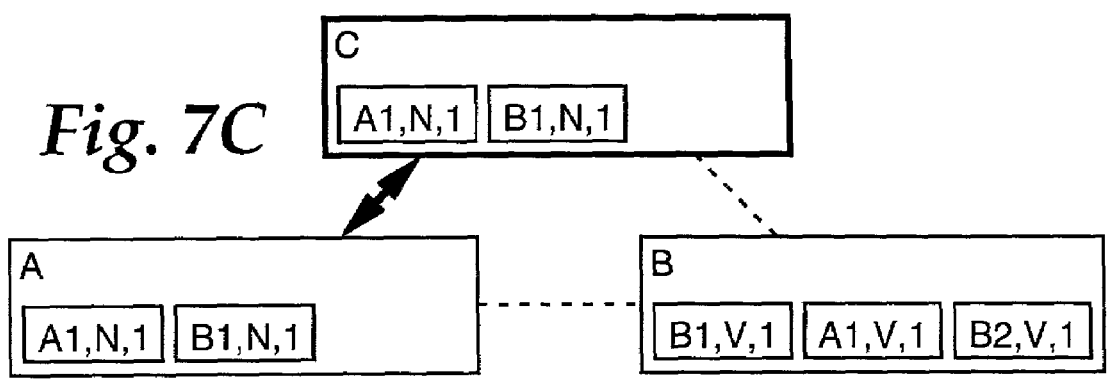

In FIG. 7C, Store A synchronizes with Store C. Since Store C is a non-volatile store, the volatility flags for bundles A1 and B1 that are copied to Store C can be reset to indicate a lower level of volatility, i.e., "N". This change occurs in the copies of bundles A1 and B1 that are located in Stores A and C. However, since Store B is not connected at this stage, its copies of the bundles retain the higher volatility level flag "V". During this time, a new bundle B2 is created in Store B.

Figure 7D:
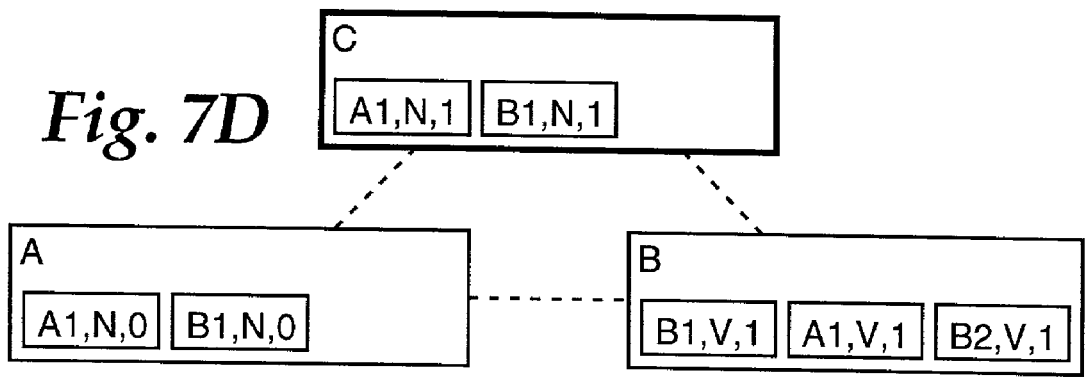

Thereafter, in accordance with the rules of behavior pertaining to the storage of objects, volatile Store A can delete the contents of the atoms in bundles A1 and B1, since they are also resident in a non-volatile store. Upon performing such an action, the completeness flags of these two bundles are reset to 0, as depicted in FIG. 7D.

Figure 7E:
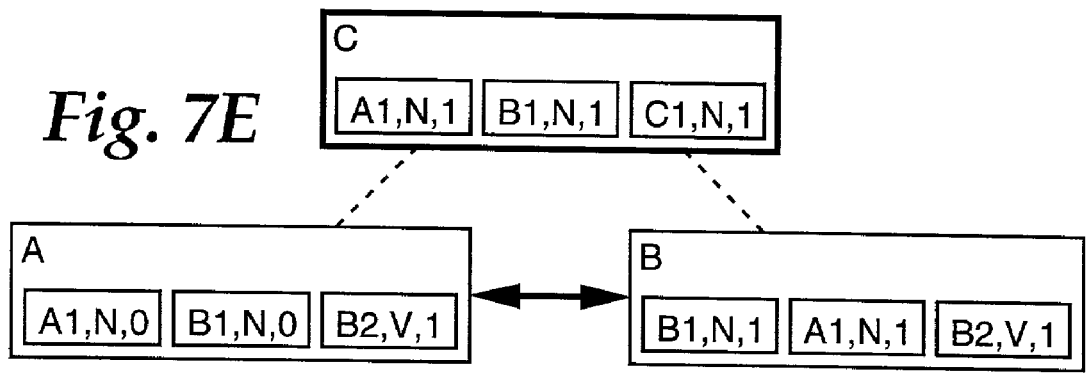

In FIG. 7E, Store A and Store B again synchronize with one another. As a result, bundle B2 is copied to Store A. In addition, the volatility flags for bundles A1 and B1 in Store B are changed to the lower volatility level "N", based on information passed from Store A to Store B. During this time, a new bundle C1 is created in Store C.

Since the copy of bundles A1 and B1 in Store B now have a lower volatility level, Store B can mark them for deletion of the content of their constituent atoms. However, if Store B has adequate storage capability, there may be no need to remove any of the stored content. In this example, that is assumed to be the case, so the completeness flags of these bundles remain at the value 1.

Figure 7F:
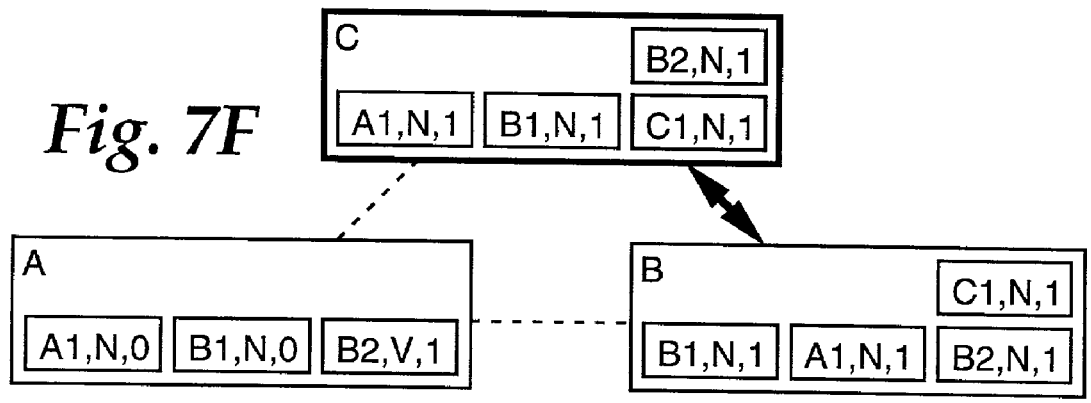

FIG. 7F depicts the subsequent synchronization of Stores B and C. In this case, bundle C1 is copied to Store B, and bundle B2 is copied to Store C. In addition, the volatility flag for bundle B2 is changed in each of these two stores, since this bundle is now resident in a non-volatile store.

Thus, it can be seen that, as part of the synchronization process, information regarding the status of bundles is exchanged between the stores and updated as appropriate, to reflect the lowest level of volatility that each bundle encounters as it is passed from store to store.

Since a bundle can theoretically contain a large amount of data, it may be preferable to transmit this data in smaller units of granularity that can be separately accounted for. In the context of the present disclosure, this unit of granularity is referred to as a "sheaf". In general, a sheaf is smaller than a bundle, but typically larger than a network packet. Each sheaf contains a unique identifier. For example, the sheaf identifier can be in the form of a bundle identifier, followed by an index integer that is equal to zero for the first sheaf in a bundle, and is subsequently incremented for each additional sheaf. If a failure should occur in the midst of a synchronization, the synchronization can be resumed without having to retransmit all of the sheaves that were successfully received by the recipient.

Synchronization Protocols

The synchronization operation involves the exchange of multiple messages between two or more stores. In the context of the present disclosure, the term "update" is employed to refer to the process of transferring atoms from one store in a space to another. An update operation causes the recipient's store graph to be equal to the union of the two recipient's store graphs prior to the operation. Hence, an update can be considered to be a primitive that can be composed into two-way and multi-way synchronization operations.

A single update operation generally requires multiple messages to be exchanged between the sender and recipient stores. The most complete form of an update may be comprised of the following sequence of messages. Messages sent by the recipient store are labeled with the letter "R", and those sent by the sending store are labeled with the letter "S".

1(R) The recipient requests an update, and sends an inventory of the bundles that it currently contains. In one form of the invention, the bundle inventory is transmitted as a run-length encoded list of bundle identifiers, along with an optional run-length encoded list of sheaf identifiers.

2(R) The recipient sends a list of the volatility flags for its bundles. The list of volatility flags can also be compressed via run-length encoding.

3(S) The sender store sends an inventory of the bundles that it has but the recipient does not have.

4(S) The sender sends a list of volatility flags for its bundles.

5(R) The recipient responds with a bundle order, comprising a list that represents the bundles that are to be received from the sender.

6(S) The sender transmits the bundles and cursor positions.

7(R) The recipient responds with a list of the bundles that it received and committed, i.e., saved and added to its atom graphs.

Depending upon the characteristics of the underlying transport mechanism that is used to exchange the data, the protocol for the update operation can omit one or more of these steps. For instance, the last step is only required if the sender wants or needs to know whether the transmission was successful. In the absence of such a situation, therefore, this step can be omitted.

In one implementation of the invention, a pull update can be initiated by a recipient's request. In the protocol for this type of update, step 5 can be eliminated, to avoid one round trip communication between the stores during the process. Eliminating this step also inhibits the ability of a recipient to specify a request that differs from the set of bundles on the sender that are missing at the recipient.

In some cases, the data may be exchanged via a medium, such as removable storage, that does not conveniently support a bidirectional conversation. Under these circumstances, a push update can be initiated by the sender. In this case, the sender relies upon a cached copy of the recipient's bundle inventory. The procedure for this type of update is set forth below. In the following notation, a primed number represents a message that travels in reverse direction, relative to the complete update protocol described previously.

3(S) The sender transmits its bundle inventory showing what it has and what it assumes the recipient does not have, based upon its cached copy of the recipient's bundle inventory.

4(S) The sender transmits its bundle volatility lists.

6(S) The sender transmits the bundles and cursor positions.

1'(S) For future reference, the sender transmits an inventory of its bundles.

The push update occurs without a final confirmation of the received bundles. If a problem occurs before the recipient can commit the changes, the result is as if the push update was never initiated.

The properties of the non-destructive data model of the present invention ensure that the worst possible consequence in this case is the transmission of superfluous bundles. If the sender has no cache of the recipient's bundle inventory, it can simply transmit all of its bundles, and the recipient can discard those which it already has.

In some cases, a recipient store may be aware of the fact that a push update would waste bandwidth. For example, since the previous connection with the sender store, the recipient may have received a number of bundles from other stores, about which the sender may not be aware. Hence, there is no need for the sender to transmit those bundles, since they are superfluous. In this case, the receiver can push its inventory, by sending the equivalent of the request portion of a pull update, namely steps 1 and 2. As a result, subsequent push updates will contain fewer, if any, superfluous bundles, thereby conserving bandwidth.

Update primitives of the type described above can be composed into multi-way transfers and adapted for particular transport media. The messages between two devices can travel online and synchronously, online and asynchronously, or offline and asynchronously. For example, in the last case a message can take the form of a file having a file association such that invocation of the file causes its contents to be interpreted by the replication system as a message. The file can be sent via e-mail, shared medium, or removable medium. Even if the time lag is great between creation of an update file at the sender and retrieval of the file's contents at the receiver, the worst possible consequence is that some atoms may have arrived from other sources in the meantime.

Different protocols can be employed, in dependence upon the type of update and the transport media. In one case, a unidirectional update can be accomplished with a bi-directional protocol. In this case, an online recipient can get an update from an online sender by invoking the pull update. The pull update can occur synchronously, for example by using a SOAP-based protocol. Alternatively, it could occur asynchronously, for instance via e-mail. In this latter situation, the participants do not need to be continuously connected to one another during the update operation.

As a third case, a synchronization operation, i.e., two-way updates, can be accomplished with a bi-directional protocol. Two stores that are connected to one another can synchronize by interleaving pull updates, for example by means of the following sequence:

1(R) One store, designated the recipient, sends an update request and its bundle inventory to the other store.

2(R) The recipient transmits its bundle volatility list.

3(S) The other store sends an inventory of its bundles.

4(S) The other store sends its bundle volatility list.

6(S) The other store transmits the bundles that it has but that the recipient store does not have, plus cursor positions.

7(R) The recipient responds with a bundle list showing what it has received and committed.

6'(R) The recipient sends bundles that it has, but the other store does not have.

7'(S) The other store responds with a bundle list showing what it has received and committed.

Again, either or both of steps 7 and 7' can be omitted if they are not considered to be necessary.

If synchronization is to occur via removable medium or e-mail, the initiator can combine a push update with a push inventory, and the other store can respond with a push update. If these steps are preceded by a push inventory, either party can initiate the synchronization operation.

As discussed previously, a final store is employed when an end-of-life process takes place. During this process, all stores in a space are requested to send an update to the final store, and all but the final store are decommissioned. The steps that are undertaken in this process can occur via any transport mechanism. The following steps illustrate an example in which the end-of-life process is carried out by means of e-mail messages:

1. The final store broadcasts a push inventory to all other stores, together with a notification that the end-of-life process is being initiated.
2. The users at each of the non-final stores complete any necessary work, and then voluntarily invoke a push update back to the final store.
3. The final store acknowledges the push update and returns a push inventory.
4. Each non-final store confirms that all bundles in that store have a volatility flag that is set to "final". If this test fails, the store returns to step 2.
5. According to the business rules that have been established for the space, or for client software executing at the local device, the non-final store may be purged from the device.
6. The non-final store notifies the final store that the end-of-life process is complete.

Store Manager

Figure 8:
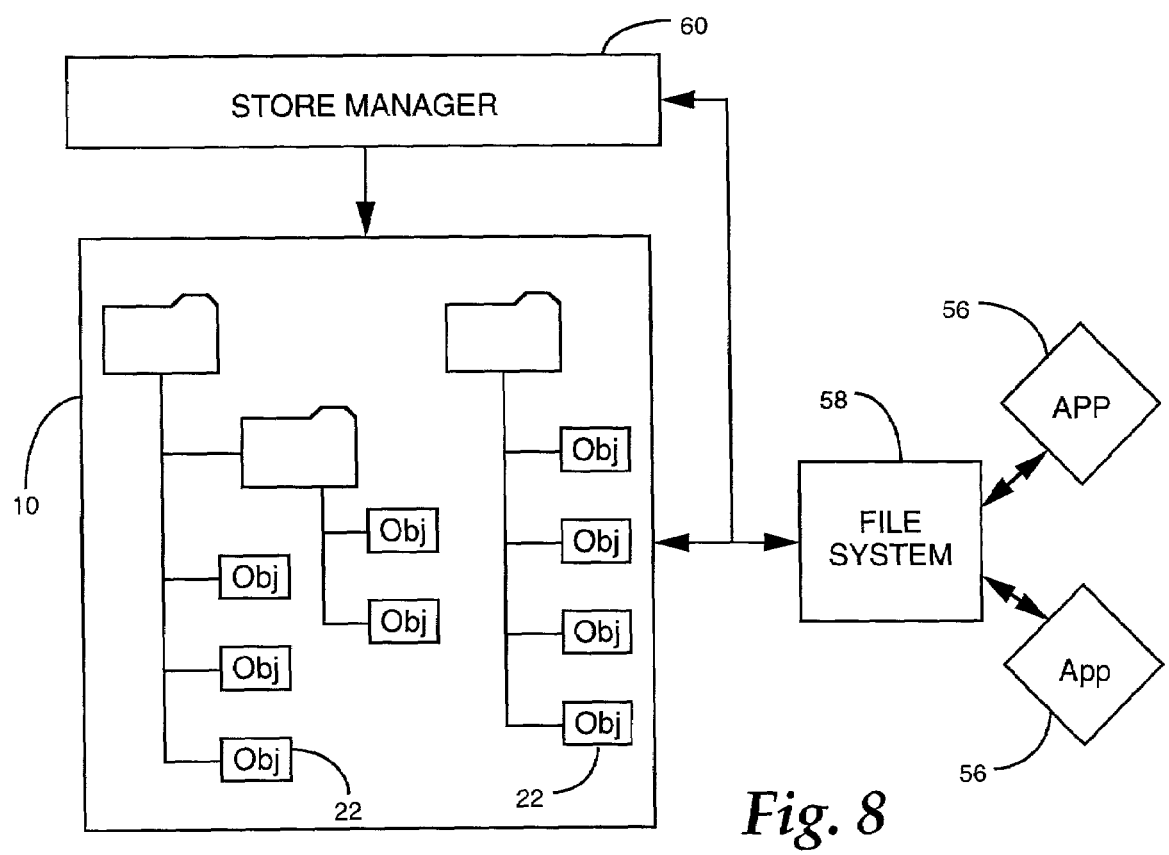
FIG. 8 is a block diagram of an exemplary architecture for a store manager.

As can be seen from the foregoing, there are a variety of operations that are carried out and rules that are enforced within the framework of the present invention. In a preferred implementation, the performance of these operations and enforcement of these rules is carried by means of a software entity that is identified herein as a "store manager". In essence, the store manager oversees all operations that affect the contents of a store. To do so, therefore, it is located within the architecture of the system so that it can intercept those operations. Referring to FIG. 8, one example of such an architecture is shown. A store 10 is physically located on storage media of the device where it is located, e.g., a hard disk drive. Access to the data objects 22 in the store by applications 56 is typically provided via the device's file system 58. The store manager 60 is situated so that it receives commands from the file system 58 that are applied to the contents of the store. Of particular interest are write operations, since they function to alter the contents of the store, e.g. create a new data object, revise the contents of an existing one, or delete an object. Whenever one of these operations occurs, the store manager 60 makes the appropriate changes to the atom graph for the affected data object 22.

Another one of the functions performed by the store manager is bundle tracking. The store manager assigns every atom that is created in a store to a bundle, either at the time of creation or a later time. It also maintains the list of the contents of every bundle, both those that are created locally and those imported from other stores. It enforces all of the rules associated with the volatility and completeness flags.

The store manager also handles all of the operations associated with updates. Thus, when two devices are linked, the store managers in the two devices communicate with one another to exchange the messages in the protocols described previously, and then add new atoms to the atoms graphs and reset flags in accordance with the information received from one another.

Typically, a store manager is only concerned with the store for a given space. In some cases, however, an object on a device may be a member of more than one space. In such a case, the store manager should be aware of this situation, so that it can handle changes to the object in a manner that supports all of the involved spaces. More particularly, one manner in which changes can be made to the object are by way of edits to the object at the local device of the store. When the store manager creates a new atom to represent the change, it assigns the atom to a bundle for each of the spaces in which the data object is a member. Hence, in the example of FIG. 1, the same atom can be assigned to two different bundles, one associated with Space I, and another associated with Space II.

Another way in which a change can occur to a data object is due to an update received from another store associated with one of the spaces. This update causes one or more atoms to be added to the object's graph. In this situation, the store manager assigns those atoms to a bundle associated with the other spaces in which the object is a member, so that they will subsequently propagate in those spaces.

A given store may support one user, or many concurrent users. In a multi-user situation, multiple implementations of the store manager can be employed, to support varying requirements of the different users.

Another function of the store manager is to support resource locators, e.g., URLs. Preferably, the store manager supports resource locators that are specific to a particular revision of an object, and resource locators that return the current version of an object. To provide the latter capability, therefore, the store manager is aware of, and utilizes, the business logic rules that determine the current version, e.g., cursor location, time-stamp, trust basis, etc.

The store manager can also provide support for applications that operate outside of the framework of the present invention. Thus, for example, the store manager can function to translate standard commands such as "save" and "delete" into the appropriate operations on the atom graph for a data object which is the subject of those commands.

Security

When data replication is involved, read-access control can be implemented cryptographically, or by limited physical distribution. In the latter case, a user is not given a replica of any content whose access is prohibited. In the cryptographic case, prohibited content can be distributed widely, but is always protected by encryption.

The cryptographic approach is preferable for the framework of the present invention because, unlike the physical approach, it allows access control to be decoupled from the hosting and distribution mechanisms. Content can travel over any transport mechanism including removable media, it can be hosted anywhere, and it can be stored and forwarded by any device without violating access-control policies. Thus, cryptographic control supports hyperdistribution from a central point via intermediate nodes, as well as peer-to-peer forwarding among devices that are connected only transiently, pairwise, or not at all. Furthermore, the cryptographic approach does not preclude limited physical distribution in applications that are amenable to such treatment.

Within the context of cryptographic access control, it is possible to use symmetric (shared) keys, and/or public keys. Reliance solely on per-user public keys becomes impractical, due to quadratic scaling issues caused by the fact that content must be distributed to multiple users, and each piece of content must be encrypted separately for each recipient. Conversely, reliance solely on shared keys is also undesirable, even if the keys are public-key encrypted for each user during distribution, because it limits the ability to target access to a subset of users.

Accordingly, security is implemented within the framework of the present invention by means of two key types. A user key is a private-public key pair that is generated by a user for himself or herself. A role key is a private-public key pair that is generated by an administrator upon the creation of a role, and subsequently distributed to users who serve in that role.

Encryption can be carried out on a per-atom basis. In this case, each object is defined as being readable by exactly one user or one role. Therefore, each atom in an object is encrypted with the corresponding user key or role key.

Alternatively, encryption can be performed on a per-bundle basis. In this case, however, the same encryption key is used for all of the constituent atoms in the bundle, so the bundles would have to be created in accordance with access rights if not all users in a space have the same rights.

A role key can undergo revisions. A user who is a current member of a role holds all of the keys associated with that role. Conversely, a user who is not a member of the role holds none of the role keys. If a user is added to a role, all versions of the role key are pushed to the newly added user.

If a user is removed from a role, a new version of the role key is created and pushed to all users who remain current members of the role. A key-deletion request is sent to the store being used by the deleted user. Upon receipt of that request, the device on which that store resides is trusted to honor the request by deleting all versions of the role key.

If the user or role associated with an object is changed, the access list of the object propagates throughout the replication network via updates, using the same mechanisms as data content.

Each store has a public-key directory in which each object contains a public key. The atom graph for that object contains revisions of the public key, as well as optional validation atoms that validate each revision. A revocation atom can be added to invalidate a key. When a key is revoked and replaced, the corresponding content is re-keyed. Both the validation atoms and the revocation atoms are digitally signed with the private key of the signer. Thus, the public half of a user key or role key is stored as part of an object, and shared by the same update mechanism that is used for object content. This approach is particularly appropriate for applications where a user in a space might need to push an encrypted update to another user.

Other mechanisms for the distribution of keys are also envisioned. In some cases, wholesale replication of the keys may be inappropriate, such as in content distribution, where a distribution hub may need every recipient's user key, but the users may not need one another's keys. Another example is where the private half of a role key is sent to a specific user, to invite that user into a role.

In one alternative approach, a key of any type can be supplied together with the request portion of a pull update, and disposed of by the sender when the update is concluded. This mechanism is referred to as a "keyed pull update", and is appropriate when secure transport is to be achieved.

In another alternative, a key of any type can be pushed to a particular store, for use by a user in connection with a role, or by a prospective sender in anticipation of a future push update. This approach is referred to as a "key push".

In either of these alternative mechanisms, when the key being transmitted is a private key or a symmetric key, it is encrypted with the recipient user's public key.

Each store includes a portion that does not undergo replication, for the storage of private keys associated with either users or roles. This area can also be used to store public keys that are not intended to be shared, such as the public keys of subscribers that are known at a content-distribution hub.

From the foregoing, therefore, it can be seen that the present invention provides a framework for data replication that is based upon a non-destructive data model, in which changes made to data objects are preserved in an atom graph, and propagated to other devices containing a replication of the data object. As a result, resolution between conflicting changes to the data object can be made immediately upon synchronizing two or more devices, or deferred to a later time in accordance with applicable business logic rules. This flexibility minimizes the need for frequent connection to the data replication network for conflict resolution, thereby providing support for users who may remain disconnected for significant periods of time.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for replicating data at multiple devices, comprising the steps of:

representing the history of a data object at each of said devices by means of a graph of atoms in a store, where said graph includes at least one parent atom of a first type that contains information pertaining to an operation performed on the data object and at least two descendant atoms of said first type;

adding an atom of said first type to the atom graph in the store at a given device when an operation is performed on the data object at said given device;

updating the history of the data object at another device by transmitting to said other device at least one atom that is present in the store at said given device and absent from the store at said other device and forming the mathematical union of the atom graphs at said given device and said other device, such that said atom graph can contain at least one parent atom having at least two direct descendant atoms that represent different versions of said data object; and at each of said devices, selectively designating either one of said different versions to be viewed as the representative version of said data object at that device.

2. The method of claim 1 wherein said atom graphs further include a second type of atom that contains information pertaining to an attribute of the data object.

3. The method of claim 2 wherein said attribute comprises access rights for the data object.

4. The method of claim 2 wherein said attribute is an approval marking for the data object.

5. The method of claim 4 wherein said approval marking is a digital signature for the data object.

6. The method of claim 1 wherein the operation on the data object comprises a change in the contents of the data object.

7. The method of claim 6 wherein the operation on the data object includes deletion of the data object.

8. The method of claim 7 wherein said atom graph is directed, acyclic and connected, such that each atom associated with an operation on the data object is connected to at least one atom associated with a version of the object that existed prior to said operation.

9. The method of claim 1 wherein the atom graph in the store at a given device has a cursor that identifies one atom in the graph that is associated with the designated version of the data object at that device.

10. The method of claim 9 wherein the cursor determines a view of the object that is presented by an application at said device.

11. The method of claim 10 wherein different views of the same object are presented by applications at different respective devices.

12. The method of claim 10 further including the step of generating metadata pertaining to a data object, and assigning said cursor to an atom by applying business rules to said metadata.

13. The method of claim 12, wherein said metadata is generated at a store when an atom is created at that store.

14. The method of claim 13, further including the step of transmitting the metadata created at a store to other stores during said updating step.

15. The method of claim 14, wherein a given store applies the business rules to metadata generated at that store and to metadata received from other stores.

16. The method of claim 12 wherein said metadata includes a time stamp for the creation of an atom, and said business rules assign the cursor on a time-related basis.

17. The method of claim 12 wherein said metadata includes an indication of a person who was responsible for the creation of an atom, and said business rules assign the cursor on a trust-related basis.

18. The method of claim 12 wherein said business rules assign the cursor on an application-specific basis.

19. The method of claim 1 wherein the atom graph in the store at a given device has plural cursors which identify at least two different respective atoms in the graph as a result of an update, and further including the step of presenting a view of each version of the data object represented by the respective identified atoms for conflict resolution.

20. The method of claim 1 further including the steps of generating metadata pertaining to a data object, and applying business rules to said metadata at a store to designate a view of the object that is presented by an application.

21. The method of claim 20, wherein said metadata is generated at a store when an atom is created at that store.

22. The method of claim 21, further including the step of transmitting the metadata created at a store to other stores during said updating step.

23. The method of claim 22, wherein a given store applies the business rules to metadata generated at that store and to metadata received from other stores.

24. The method of claim 20 wherein said metadata includes a time stamp for the creation of an atom, and said business rules determine the designated view on a time-related basis.

25. The method of claim 20 wherein said metadata includes an indication of a person who was responsible for the creation of an atom, and said business rules determine the designated view on a trust-related basis.

26. The method of claim 20 wherein said business rules determine the designated view on an application-specific basis.

27. The method of claim 1 further including the step of assigning an atom in a store to a bundle for transmission to another device during an update step.

28. The method of claim 27 wherein plural atoms are assigned to a single bundle.

29. The method of claim 27 wherein the contents of an atom become fixed when it is assigned to a bundle, and subsequent operations on the data object result in the creation of a new atom.

30. The method of claim 27 wherein a bundle is automatically created in a store in advance of a transmission containing said bundle.

31. The method of claim 27 wherein a bundle is created in a store in response to a request for a transmission from another store.

32. The method of claim 27 wherein one store sends a list of its bundles to another store during said updating step.

33. The method of claim 32 wherein the bundles in said list are run-length encoded.

34. The method of claim 27 wherein a bundle is comprised of plural sheaves that form individual units for transmission.

35. The method of claim 34 wherein one store sends a list of its sheaves to another store during said updating step.

36. The method of claim 27 further including the steps of assigning different levels of volatility to stores at different respective devices and selectively deleting atoms in a bundle from a given store in accordance with its assigned level of volatility.

37. The method of claim 36 further including the steps of associating a volatility flag with each bundle, and setting the flag to identify the least volatile level of store in which a copy of the bundle is known to be stored.

38. The method of claim 37 wherein said volatility flag is separately set at each store, and further including the step of resetting the flag as appropriate in response to data received during said updating step.

39. The method of claim 37 wherein one of said assigned levels is classified as volatile and another assigned level is classified as non-volatile, and wherein a bundle is identified for deletion from a volatile store when its volatility flag indicates that it has been stored in a non-volatile store.

40. The method of claim 39 wherein an atom comprises a content component and an identity component, and wherein the content component of the atom is deleted from a volatile store after it has been identified for deletion while its identity component is retained in the store.

41. The method of claim 40 wherein a bundle includes a completeness flag, and further including the step of setting said completeness flag to indicate whether the atoms of a bundle include their content component.

42. The method of claim 39 wherein an atom comprises a content component and an identity component, and wherein both components are deleted from a volatile store after the atom has been identified for deletion.

43. The method of claim 39 wherein another assigned level is classified as final, to which an atom is transmitted during an end-of-life process.

44. The method of claim 43 wherein an atom comprises a content component and an identity component, and wherein both components are deleted from the volatile and non-volatile stores after the atom has been transmitted to a final store.

45. The method of claim 43 wherein an end-of-life process includes the steps of broadcasting the final store's inventory and a notification that the end-of-life process is taking place.

46. The method of claim 45 wherein, in response to receipt of said broadcast, the stores other than said first store perform an updating operation with said final store.

47. The method of claim 46, further including the step of setting the volatility flags in said other stores to indicate that a bundle has been updated to the final store.

48. The method of claim 47 further including the step of deleting the bundles in said other stores whose volatility flags have been set to a final value.

49. The method of claim 37 wherein said updating step comprises the transmission of information pertaining to atoms from a sender store to a receiver store.

50. The method of claim 49 wherein said information is transmitted by means of a synchronous communications network.

51. The method of claim 49 wherein said information is transmitted by means of a file that is attached to an e-mail message.

52. The method of claim 49 wherein said information is transmitted by means of a file that is stored on a removable medium.

53. The method of claim 49 wherein said information is transmitted with the following steps:
the recipient store requests an update, and sends a first inventory of the bundles that it currently contains;
the recipient store sends a list of the volatility flags for its bundles;
the sender store sends a second inventory of the bundles that it has but the recipient does not have;
the sender sends a list of volatility flags for its bundles; and
the sender store transmits the bundles in said second inventory.

54. The method of claim 53 further including the step wherein the recipient store responds with a list that represents the bundles that are to be received from the sender, after the sender store sends an inventory of the bundles that it has but the recipient does not have.

55. The method of claim 53 further including the step wherein the recipient store responds with a list of the bundles that it received and added to its atom graphs.

56. The method of claim 49 wherein said information is transmitted with the following steps:
the sender store caches a copy of a recipient's bundle inventory;
the sender store transmits a bundle inventory showing what it has and what it assumes the recipient store does not have, based upon its cached copy of the recipient's bundle inventory;
the sender store transmits its bundle volatility list; and
the sender store transmits the bundles.

57. The method of claim 56 further including the step in which the sender store transmits an inventory of its bundles, for future reference.

58. The method of claim 56 further including the step in which a recipient store broadcasts an inventory of its bundles prior to said steps performed by the sender store.

59. The method of claim 36, wherein at least one store does not have an assigned level of volatility.

60. The method of claim 59 wherein said one store is capable of receiving data objects from other stores, but is inhibited from replicating data objects to stores that have assigned levels of volatility.

61. The method of claim 27 wherein said updating step comprises the transmission of information pertaining to atoms from a sender store to a receiver store.

62. The method of claim 61 wherein said information is transmitted with the following steps:
the recipient store requests an update, and sends a first inventory of the bundles that it currently contains;
the sender store sends a second inventory of the bundles that it has but the recipient does not have; and
the sender store transmits the bundles in said second inventory.

63. The method of claim 62 further including the step wherein the recipient store responds with a list that represents the bundles that are to be received from the sender, after the sender store sends an inventory of the bundles that it has but the recipient does not have.

64. The method of claim 62 further including the step wherein the recipient store responds with a list of the bundles that it received and added to its atom graphs.

65. The method of claim 61 wherein said information is transmitted with the following steps:
the sender store caches a copy of a recipient's bundle inventory;
the sender store transmits a bundle inventory showing what it has and what it assumes the recipient store does not have, based upon its cached copy of the recipient's bundle inventory; and
the sender store transmits the bundles.

66. The method of claim 65 further including the step in which the sender store transmits an inventory of its bundles, for future reference.

67. The method of claim 65 further including the step in which a recipient store broadcasts an inventory of its bundles prior to said steps performed by the sender store.

68. The method of claim 1 wherein said updating step comprises the transmission of information pertaining to atoms from a sender store to a receiver store.

69. The method of claim 68 wherein said information is transmitted by means of a synchronous communications network.

70. The method of claim 68 wherein said information is transmitted by means of a file that is attached to an e-mail message.

71. The method of claim 68 wherein said information is transmitted by means of a file that is stored on a removable medium.

72. The method of claim 68 wherein said information is transmitted with the following steps:
the recipient store requests an update, and sends a first inventory of the atoms that it currently contains;
the sender store sends a second inventory of the atoms that it has but the recipient does not have; and
the sender store transmits the atoms in said second inventory.

73. The method of claim 72 further including the step wherein the recipient store responds with a list that represents the atoms that are to be received from the sender, after the sender store sends an inventory of the atoms that it has but the recipient does not have.

74. The method of claim 72 further including the step wherein the recipient store responds with a list of the atoms that it received and added to its atom graphs.

75. The method of claim 68 wherein said information is transmitted with the following steps:
the sender store caches a copy of a recipient's atom inventory;
the sender store transmits an atom inventory showing what it has and what it assumes the recipient store does not have, based upon its cached copy of the recipient's atom inventory; and the sender store transmits the atoms.

76. The method of claim 75 further including the step in which the sender store transmits an inventory of its atoms, for future reference.

77. The method of claim 75 further including the step in which a recipient store broadcasts an inventory of its atoms prior to said steps performed by the sender store.

78. The method of claim 1 further including the step of encrypting information pertaining to an atom using a public-private key pair.

79. The method of claim 78 wherein said information is encrypted on a per-atom basis.

80. The method of claim 78 wherein the private key of said pair is held by only one person.

81. The method of claim 78 wherein the private key of said pair is held by a plurality of people.

82. The method of claim 78, further including the steps of storing the public key in the store in association with the atom graph, and providing said public key to said other device during said update step.

83. The method of claim 78 wherein said atom graph includes a validation atom that validates a revision to the public key and is digitally signed with a private key.

84. The method of claim 78 wherein said atom graph includes a revocation atom that revokes the public key and is digitally signed with a private key.

85. The method of claim 1 wherein each of said stores is associated with a space that pertains to a set of information, and different ones of said stores are respectively associated with different spaces.

86. The method of claim 85 wherein a data object is a member of plural spaces.

87. The method of claim 86 further including the step of detecting the addition of an atom to the atom graph for said data object, and designating said added atom for transmission to stores associated with all of the spaces of which said data object is a member.

88. The method of claim 1 wherein one store is associated with a hub device, and said updating step is carried out unidirectionally from the store at said hub device to all of the other stores.

89. The method of claim 88 further including the step of assigning a cursor to an atom in the graph at each store to identify a current version of the data object.

90. The method of claim 89 wherein the cursor is assigned at said hub device, and said assignment is transmitted to said other stores from the hub device during said updating step.

91. The method of claim 89 further including the step of notifying users at devices other than said hub device that a revision has been made to a data object, and enabling said users to assign the cursor at said other devices.

92. The method of claim 88 wherein said updating step is performed by pushing information pertaining to said atoms from said hub device to said other stores.

93. The method of claim 88 wherein said updating step is initiated by sending a request from said other stores to said hub device.

94. The method of claim 88 wherein a first updating step is performed unidirectionally from said hub device to a first set of intermediate stores, and a second updating step is performed unidirectionally from said intermediate stores to other stores.

95. The method of claim 1 wherein one store is associated with a hub device, and said updating step is carried out bidirectionally between the store at said hub device and all of the other stores.

96. The method of claim 95 wherein the atom graph at each store has a cursor that identifies an atom pertaining to a current version of the data object.

97. The method of claim 96 wherein the atom identified by the cursor can only be changed at said hub device, and said change is transmitted to said other stores from the hub device during an updating step.

98. The method of claim 1 wherein stores are present at a multiplicity of devices, and a store at any device is capable of performing said updating step with a store at any other device.

99. The method of claim 98 wherein the performance of said updating step between a first store and a second stores results in a conflict, and further including the steps of:
  a) performing an update between a third store and one of said first and second stores;
  b) detecting and resolving said conflict at said third store; and
  c) performing an update between said third store and each of said first and second stores, to thereby resolve said conflict at said first and second stores.

100. The method of claim 99 wherein the update of step (c) is carried out directly between said third store and at least one of said first and second stores.

101. The method of claim 99 wherein the update of step (c) between said third store and at least one of said first and second stores is carried out indirectly by way of an intermediary store.

102. The method of claim 1 wherein each of said parent atom and said descendant atoms contains a complete set of data for the version of the data object to which the atom pertains.

103. The method of claim 1 wherein a parent atom contains a complete set of data for the version of the data object to which the atom pertains, and descendant atoms contain information regarding differences between said complete set and the respective versions of the data object to which they pertain.

104. The method of claim 1 wherein a descendant atom contains a complete set of data for the version of the data object to which the atom pertains, and a parent atom contains information regarding differences between said complete set and the version of the data object to which said parent atom pertains.

105. The method of claim 1, wherein said data object is a document.

106. A method for replicating data at multiple devices, comprising the steps of:
  representing the history of a data object at each of first and second devices by means of a graph of atoms, where said atoms contain information pertaining to changes in the content of the data object, and said graph contains at least one parent atom having at least two descendant atoms;
  adding an atom to the atom graph at said first device when a change is made to the data object at said first device;
  updating the history of the data object at a second device by forming a new graph at said second device that is a strict superset of the of the atom graph that existed at said second device prior to said updating step, and a non-strict subset of the union of the atom graphs that existed at said first and second devices prior to said updating step, such that said atom graph can contain at least one parent atom having at least two direct descendant atoms that represent different versions of said data object; and at each of said devices, selectively designating either one of said different versions to be viewed as the representative version of said data object at that device.

107. The method of claim 106 wherein said updating step comprises forming the mathematical union of the atom graphs that existed at said first and second devices prior to said updating step.

108. The method of claim 106 wherein said two descendant atoms contain information that pertains to different respective versions of said data object.

109. The method of claim 106, wherein said data object is a document.

110. A system for replicating data at multiple devices, comprising:
- a store at each of said devices, each of said stores containing replicas of a data object;
- a manager associated with each store that detects and records operations performed on the data object in the form of a graph of atoms containing at least one parent atom having at least two descendant atoms, and that updates the history of the data object by receiving atoms that are contained in a graph at one store and adding said atoms to the graph in another store by forming the mathematical union of the atom graphs at said two stores, such that said atom graph can contain at least one parent atom having at least two direct descendant atoms that represent different versions of said data object; and
- means for selectively designating either one of said different versions at a given store to be viewed as the representative version of said data object at the device associated with that store.

111. The system of claim 110 wherein the manager associated with one store communicates with a manager associated with another store to perform said updates.

112. The system of claim 111 wherein said communications take place via a synchronous network.

113. The system of claim 111 wherein said communications occur asynchronously.

114. The system of claim 111 wherein said communications occur via e-mail.

115. The system of claim 111 wherein said communication occur via files on a removable medium.

116. The system of claim 111 wherein said managers assigns an atom in a store to a bundle for transmission to another store.

117. The system of claim 116 wherein said manager assigns plural atoms to a single bundle.

118. The system of claim 116 wherein said manager can modify the contents of an atom before it is assigned to bundle, and thereafter creates a new atom when an operation is performed on the data object.

119. The system of claim 110, wherein said data object is a document.

* * * * *